United States Patent [19]

Gonzalez-Lopez et al.

[11] Patent Number: 4,866,637
[45] Date of Patent: Sep. 12, 1989

[54] PIPELINED LIGHTING MODEL PROCESSING SYSTEM FOR A GRAPHICS WORKSTATION'S SHADING FUNCTION

[75] Inventors: Jorge Gonzalez-Lopez, Red Hook; Bruce C. Hempel, Tivoli; Bob C. Liang, West Hurley, all of N.Y.

[73] Assignee: International Business Machines Corporation, Armonk, N.Y.

[21] Appl. No.: 115,467

[22] Filed: Oct. 30, 1987

[51] Int. Cl.⁴ .......................................... G06F 15/40
[52] U.S. Cl. .................................... 364/518; 340/747
[58] Field of Search ............... 364/518, 519, 521, 522; 340/721, 723, 729, 747, 742

[56] References Cited

U.S. PATENT DOCUMENTS

| | | | |
|---|---|---|---|
| 4,241,341 | 12/1980 | Thorson | 340/747 X |
| 4,361,850 | 11/1982 | Nishimura | 340/723 X |
| 4,646,075 | 2/1987 | Andrews et al. | 340/747 |
| 4,658,247 | 4/1987 | Gharnschorloo | 340/747 |
| 4,709,231 | 11/1987 | Sakaibara et al. | 340/747 X |
| 4,737,921 | 4/1988 | Goldwasser et al. | 340/721 X |

OTHER PUBLICATIONS

Foley and Van Dam book "Fundamentals of Interactive Computer Graphics" by Addison-Wesley, 1984, pp. 575-584.

Primary Examiner—A. D. Pellinen
Assistant Examiner—A. Jonathan Wysocki
Attorney, Agent, or Firm—Mark S. Walker; J. Dennis Moore

[57] ABSTRACT

A lighting model processing system for a computer graphics workstation's shading function includes multiple floating point processing stages arranged and operated in pipeline. Each stage is constructed from one or more identical floating point processors. The lighting model processing system supports one or more light sources illuminating an object to be displayed, with parallel or perspective projection. Dynamic partitioning can be used to balance the computational workload among various of the processors in order to avoid a bottleneck in the pipeline. The high throughput of the pipeline system makes possible the rapid calculation and display of high quality shaded images.

27 Claims, 4 Drawing Sheets

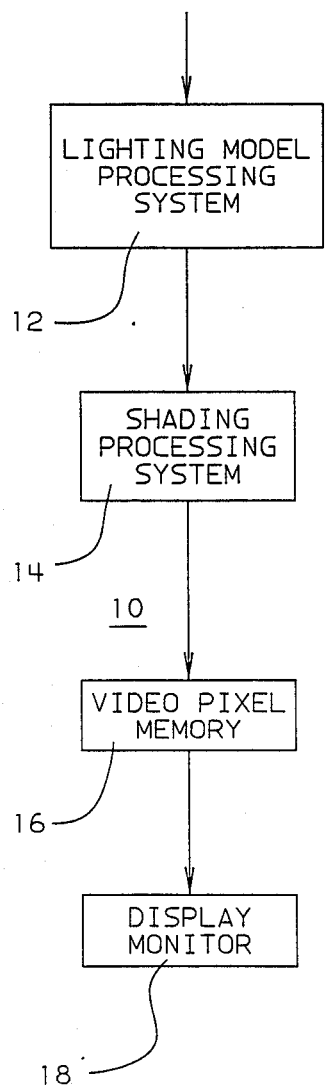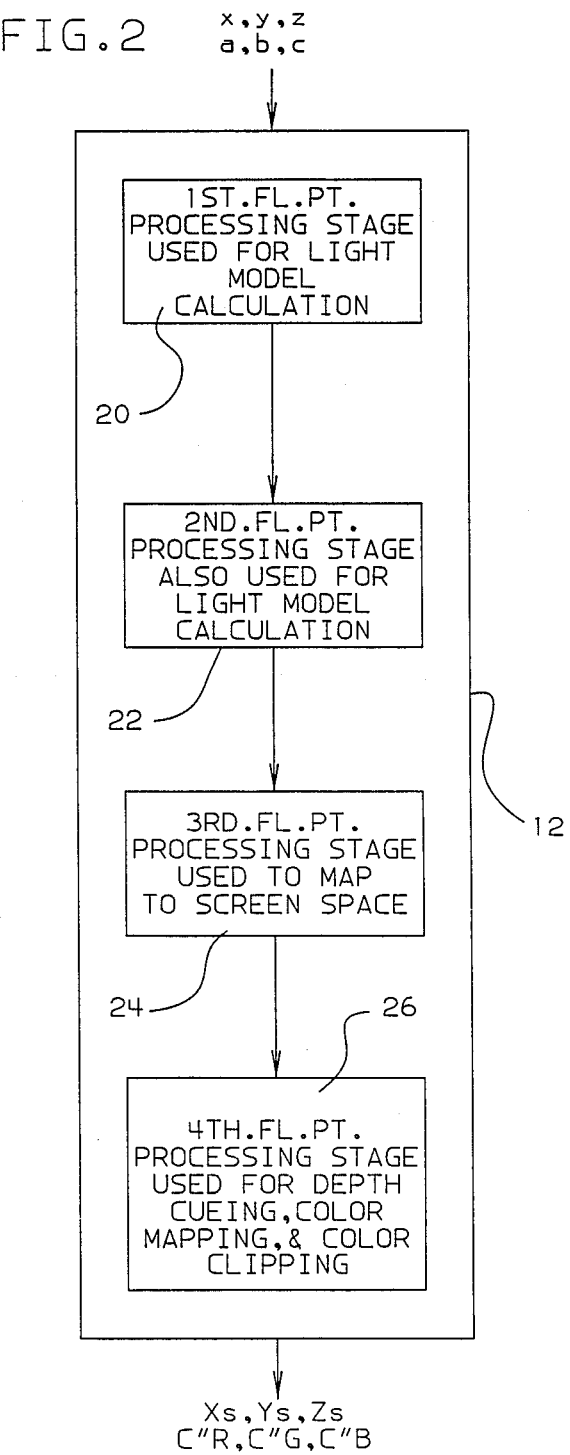

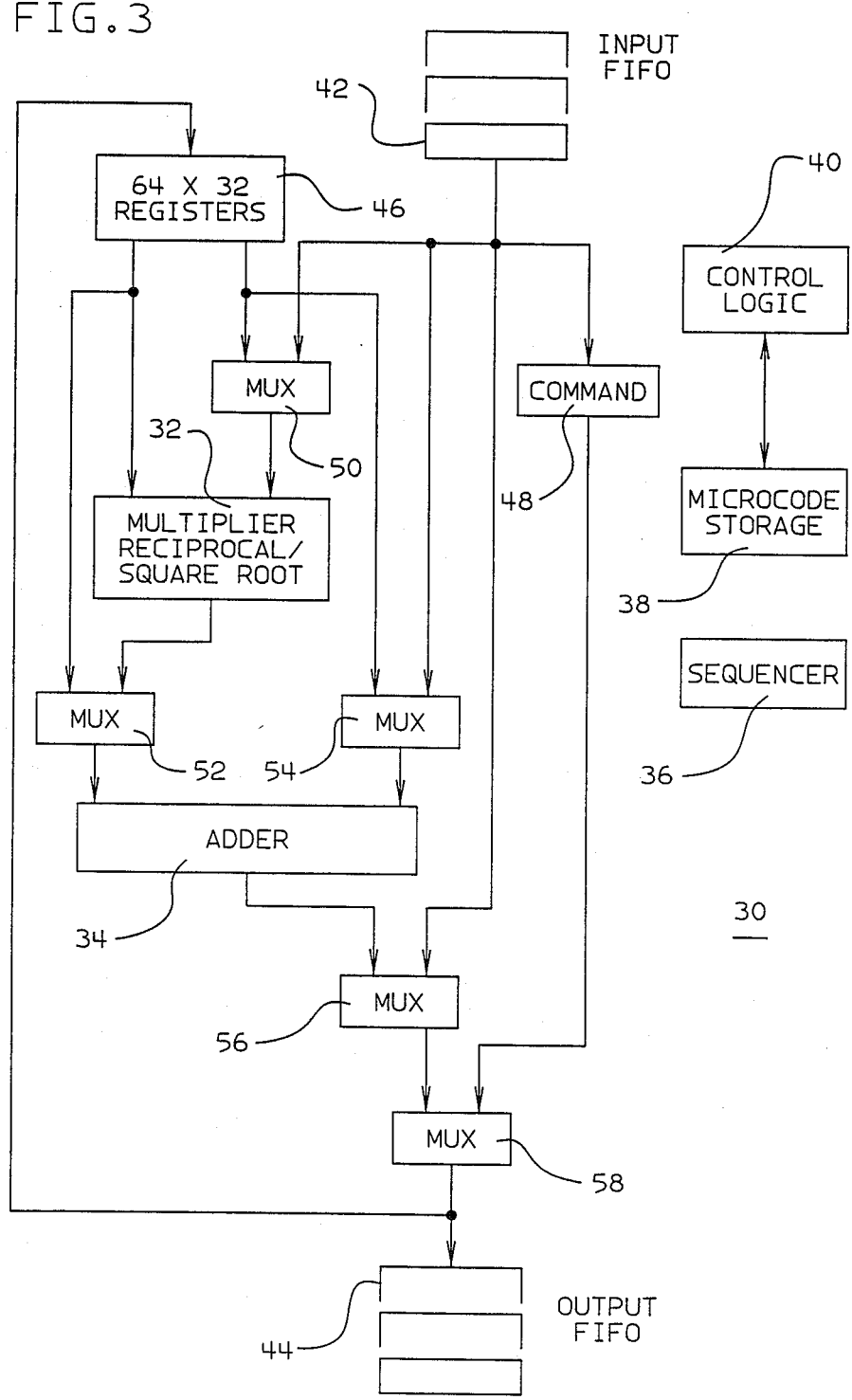

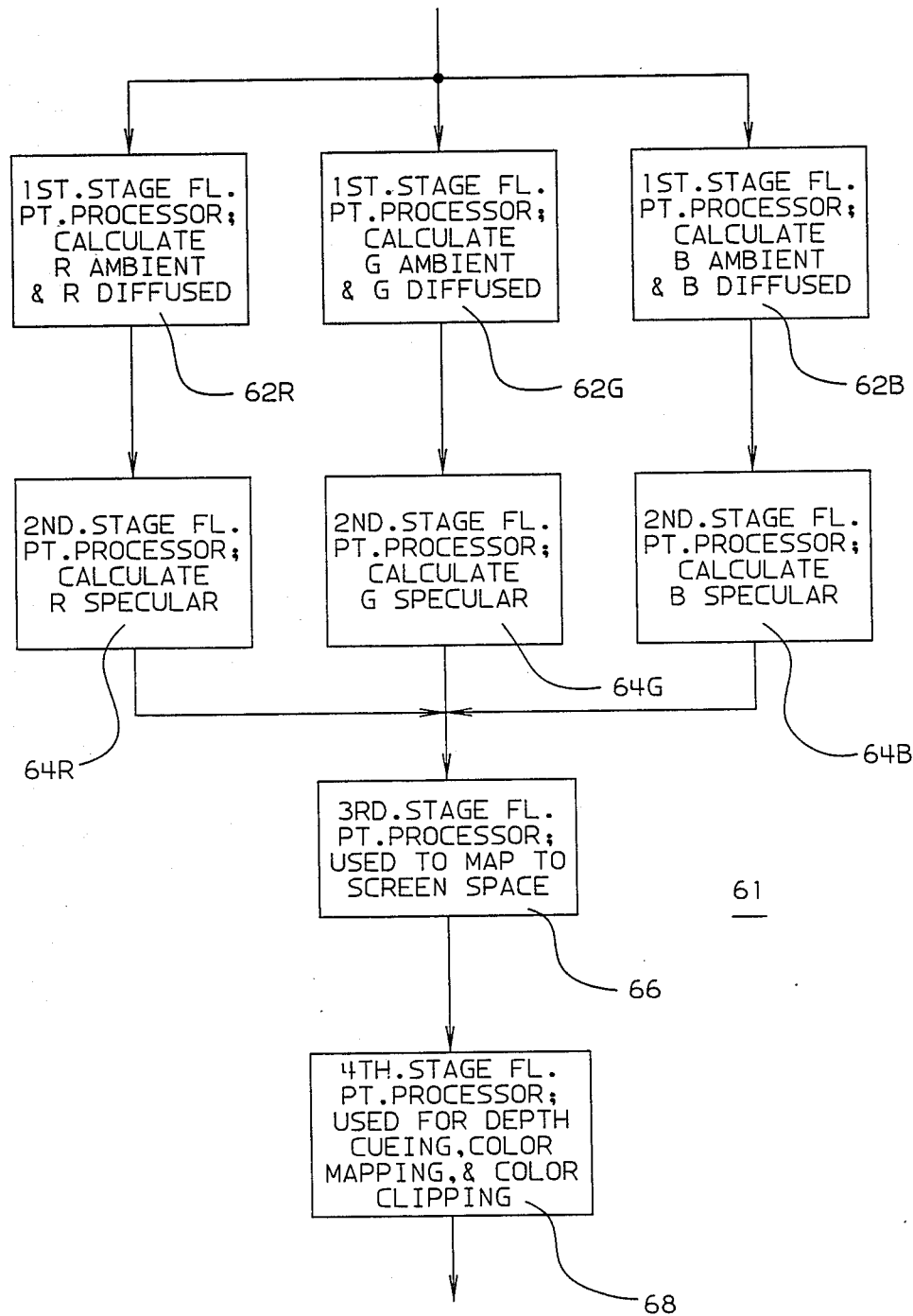

PIPELINED LIGHTING MODEL PROCESSING SYSTEM FOR A GRAPHICS WORKSTATION'S SHADING FUNCTION

BACKGROUND OF THE INVENTION

The present invention relates, generally, to the field of computer graphics. Computer graphics display systems, e.g. CAD/CAM graphics workstations, are widely used to generate and display images of objects for scientific, engineering, manufacturing and other applications.

In such computer graphics systems, surfaces of an object are usually represented by a polygon mesh. A polygon mesh is a collection of vertices, edges, and polygons. The vertices are connected by edges, while polygons can be thought of as sequences of edges or of vertices. To present a visual image of an object on the viewing screen of the display which is more realistic in appearance than the corresponding polygon mesh, procedures have been developed for removing hidden surfaces and shading and adding texture to visible surfaces.

The present invention relates to implementation of a shading function in a graphics workstation and more specifically to the computer processing and display of shaded images in which a lighting model is used. Effects which may be taken into account in such a lighting model include ambient lighting, diffuse and specular reflection effects, the number, position, intensity and hue of the light sources, parallel and perspective projections, and attenuation of the light due to the distance of different portions of an object being modeled from the viewer (depth cueing).

The general system architecture of shading hardware for a graphics workstation is depicted, in block diagram form, in FIG. 1. The overall shading function system 10 includes a lighting model processing system 12, a shading processing system 14, a video pixel memory 16 and a display monitor 18.

The lighting model processing system 12 calculates the color intensities (e.g. red, green and blue components) at the vertices of each polygon for a specified lighting model. The shading processing system 14 uses the information from the lighting model processing system to calculate the color intensities of pixels interior to visible polygons and sends this information to the video pixel memory 16. The display monitor 18 displays the shaded image stored in the video pixel memory.

In prior graphics workstations, calculation of the effects due to lighting has been performed by some type of general purpose processor. This approach, while having the advantage of using commonly available "off the shelf" components, suffers the disadvantage of being slow, since the entire process is performed by a single general purpose processing element.

SUMMARY OF THE INVENTION

According to the present invention, calculation of the effects due to lighting is done by a number of identical floating point processing elements that are connected and operated in a pipeline fashion. The pipeline configuration used may be purely serial, or it may be serial with certain stages of the pipeline containing parallel arrangements of the same identical processing element.

By using a pipeline arrangement of multiple identical processing elements to perform the computation-intensive lighting model calculations, a many-fold improvement in throughput is achieved. By dramatically increasing the number of polygons/second the system can process, it is possible to use much finer polygonal meshes to represent any given object, and the use of finer meshes yields shaded images of much greater realism. Thus, the performance increase afforded by the use of the present invention manifests itself to the workstation user in the forms of improved interactivity and higher image quality.

Accordingly, it is a principal object of the present invention to provide a method and apparatus for performing a lighting model processing, as part of a shading function in a computer graphics display system, which exhibits higher throughput than heretofore available.

Another object is to provide a lighting model processing system which facilitates higher image quality and realism and improved interactivity.

Yet another object is to provide a lighting model processing system which is readily assembled, and is fast, efficient and versatile in operation.

BRIEF DESCRIPTION OF THE DRAWINGS

These and other objects, features and advantages of the present invention will be more readily understood from the following detailed description, when read in conjunction with the accompanying drawings in which:

FIG. 1 is a block diagram depicting a hardware implementation of a shading function in a computer graphics workstation;

FIG. 2 is a block diagram of a generalized embodiment of the lighting model processing system of the present invention;

FIG. 3 depicts a preferred embodiment of the processor of the present invention;

. FIG. 5 depicts an alternate single light source configuration of the lighting model processing system of FIG. 4.

Figure 4:
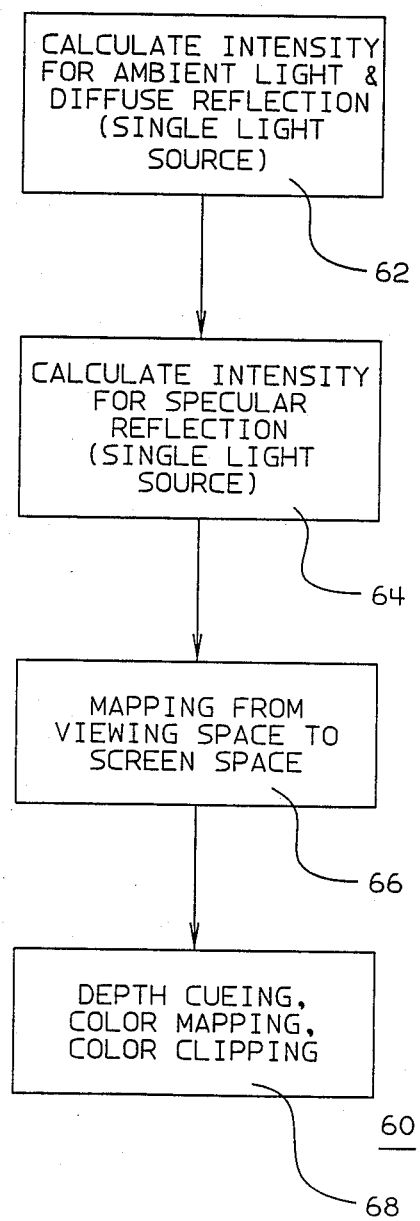
FIG. 4 is a block diagram depicting a single light source configuration of a lighting model processing system of the present invention.

Various embodiments of the invention, including specific structural, programming and functional details, are described hereinafter. These specifics are merely representative and are not intended to be construed as limiting the principles of the invention, the scope of which is defined by the claims appended hereto.

DETAILED DESCRIPTION

The lighting model processing system of the present invention consists of multiple floating point processing stages connected in series and operated in pipeline fashion. Each stage preferably comprises one or more identical floating point processors (also referred to as processing elements). Each stage is considered to be a separate processing unit which performs its particular function(s) concurrently with the other stages, thereby producing a marked increase in throughput.

FIG. 2 portrays a first embodiment of the lighting model calculation system 12 consisting of four floating point processing stages 20, 22, 24 and 26, in pipeline. First stage 20 and second stage 22 are used for lighting model calculations. Third stage 24 is employed to perform a projection transformation and to map from a viewing space to a screen space and fourth stage 26 is used for depth cueing, color mapping and color clipping. The functions of these different stages are described in more detail hereinafter. The number and order of stages, as well as the partitioning of functions among the stages, may vary from that shown in FIG. 2.

As illustrated in FIG. 2, the input to lighting model processing system 12 consists of:

x, y, z which represent the coordinates, in viewing space, of the vertices of a polygon; and a, b, c which represent the X, Y, and Z components of the normal at each of the vertices of the polygon.

These inputs are in floating point format and are produced by a geometry processor (not shown) earlier in the graphics display system. The output of the lighting model processing system 12 consists of:

Xs, Ys, Zs which represent the screen coordinates of the vertices of the polygon; and C"R, C"G, C"B which represent the color intensity values (R denoting the red component, G denoting the green component and B denoting the blue component) to be displayed at each vertex of the polygon.

The output screen vertex coordinates and RGB intensity values are integers, with the intensity values being in the range of the capabilities of the display system. The output of lighting model processing system 12 is provided to a shading processing system 14, as shown in FIG. 1, wherein the intensity values at the vertices are, in effect, interpolated across the visible face of the polygon so that a realistically shaded image of the object may be displayed.

INPUT PREPROCESSING

Computer graphics display systems must handle 1-sided and 2-sided surfaces depending upon the nature of the object being modeled. To simplify the operation of the lighting model processing system of the present invention, a preprocessing step is implemented in the preceding geometry processor to ensure that all of the input polygons to the lighting model processing system are 1-sided polygons with normals pointing towards the viewer. The preprocessing step, which can be implemented in software or hardware or a combination thereof, processes incoming polygons based on their surface normal in the following way:

1. 1-sided surface
   a. If the dot product of the polygon normal and the vector from the object to the viewpoint is positive, then the polygon is facing forward, and the polygon data is sent to the lighting model processing system as input,
   b. If the dot product of the polygon normal and the vector from the object to the viewpoint is negative, then the polygon is facing backward, and the polygon is discarded before reaching the lighting model processing system.
2. 2-sided surface
   a. If the dot product of the polygon normal and the vector from the object to the viewpoint is positive, then the polygon is facing forward, and the polygon data is sent to the lighting model processing system as input,
   b. If the dot product of the polygon normal and the vector from the object to the viewpoint is negative, then the polygon is facing backward; therefore the vertex normals are reversed, and the rest of the polygon data is sent to the lighting model processing system as input.

Accordingly, the input to the lighting model processing system has the following format:
x1, y1, z1 (vertex 1 coordinates)
a1, b1, c1 (vertex 1 normal)
x2, y2, z2 (vertex 2 coordinates)
a2, b2, c2 (vertex 2 normal)
etc.

FLOATING POINT PROCESSOR

Each stage of the pipelined lighting model processing system of the present invention is composed of one or more identical floating point processors. The common usage of the same processor results in efficiencies in manufacturing, assembly, operation, programming and maintenance of the lighting model processing system.

A suitable processor 30 for implementing the lighting model processing system of the present invention is depicted in FIG. 3. Processor 30 is a graphics floating point processing element which, in its presently preferred form, comprises a VLSI chip with 32-bit floating point capability. Processor 30 includes: a floating point multiplier 32 (preferably with 2-stages of internal pipeline and special hardware assists for calculating inverses and square root); a floating point adder 34, also used as an accumulator for the multiplier 32; a sequencer 36; storage 38, e.g. RAM, for control programs, e.g. microcode, and control logic 40; input FIFO 42 and output FIFO 44 for interface purposes; a bank 46 of registers for storing data (e.g. sixty-four 32-bit registers); a command register 48; and a plurality of multiplexers 50, 52, 54, 56 and 58. These components of processor 30 are connected as shown in FIG. 3. Sequencer 36 controls the operation of the other components and in turn is under microcode control for program flow, i.e., branch, subroutine call, etc.

The input/output data path is 33 bits wide, and consists of a 32-bit data field and a 1-bit flag which indicates whether the data field is a command or a floating point number. A command in the datastream instructs the graphics floating point processor how to use the floating point data that follows it; for instance, the datastream to cause a polygon to be shaded would consist of a 'shaded polygon' command followed by the floating point data (vertices and normals at the vertices) that define the polygon to be shaded.

The data put into the input FIFO of a Floating Point Processor is produced by a front-end processor of some type or by another Floating Point Processor. In the latter case, the other Floating Point Processor's output FIFO is directly connected to the input FIFO. A particularly advantageous approach for interconnecting such identical floating point processors in pipeline and/or parallel arrangements is described in concurrently filed, commonly assigned application Application Ser. No. 07/115,150 which description is incorporated by reference herein.

The microcode reads the data from the input FIFO 42, and performs the following functions:
1. if it is a command, it will be passed to a decoding ram to branch to the correct microcode subroutine; in this case, it is also stored in the command register 48, and if the microcode is so programmed, may be passed to the output FIFO 44;
2. if it is floating point data, it can be
   a. stored in the register bank 46; or
   b. passed to the multiplier 32 as one of the inputs to the multiplier; or c. passed to the adder (accumulator) 34 as one of the inputs to the adder; or d. passed directly to the output FIFO 44; or e. ignored (not used).

PROCESSOR DATA FLOW

The following example of vector multiplication is helpful in understanding how data flows within processor 30.

Example: Calculate m1*x+m2*y+m3*z where m1, m2, m3 are in the internal registers an asterisk "*" denotes a multiplication operation, and the input data is

| vector multiplication | (command) |
|---|---|
| x | (data) |
| y | (data) |
| z | (data) |

1. read from the input FIFO 42 the 32-bit words, 2. when the 'vector multiplication' command is encountered (signaled to the hardware by the command bit being on, and the particular value of the 32-bit data field), the microcode branches to a subroutine in the microcode storage that performs the vector multiplication, the address of the subroutine being obtained by the hardware via a branch table;

3. the subroutine reads in the next word, in this case the data x; the data x will be passed to the multiplier input, and m1 will be passed to the other input of the multiplier 32 for the multiplication operation.

4. the subroutine reads in the next word, in this case the data y; the data y will be passed to the multiplier input, and m2 will be passed to the other input of the multiplier for the multiplication operation; at the same time the product m1*x is passed to the second internal stage of the multiplier.

5. the subroutine reads in the next word, in this case the data z; the data z will be passed to the multiplier input, and m3 will be passed to the other input of the multiplier for the multiplication operation. At the same time, the product of m1*x is accumulated in the adder with the value zero.

6. the product m2*y is passed to the adder 34 and added to m1*x.

7. the product m3*z is passed to the adder and added to m1*x+m2*y, and the result is written to the output FIFO 44

In the lighting model processing system of this invention, a typical data stream will be as follows:

| begin shaded polygon | (command) |
|---|---|
| x1 | (vertices data) |
| y1 | (vertices data) |
| z1 | (vertices data) |
| a1 | (vertices normal data) |
| b1 | (vertices normal data) |
| c1 | (vertices normal data) |
| x2 | (vertices data) |
| y2 | (vertices data) |
| z2 | (vertices data) |
| a2 | (vertices normal data) |
| b2 | (vertices normal data) |
| c2 | (vertices normal data) |
| xn | (vertices data) |
| yn | (vertices data) |
| zn | (vertices data) |
| an | (vertices normal data) |
| bn | (vertices normal data) |
| cn | (vertices normal data) |

| -continued | |
|---|---|
| end shaded polygon | (command) |

The processing of the above datastream is done as follows:

1. the microcode reads from the input FIFO the 32-bit words of the datastream as needed, 2. when the 'begin shaded polygon' command is encountered (signaled to the hardware by the command bit being on, and the particular value of the 32-bit data field), the microcode branches to a subroutine in the microcode storage that processes shaded polygon data, the address of the subroutine being obtained by the hardware via a branch table;

3. the microcode subroutine reads data from the input FIFO as needed and processes it according to the subroutine's design; when an output is generated, it is put into the output FIFO.

4. when the 'end shaded polygon' command is processed, the Floating Point Processor jumps to another microcode routine that completes the processing required for shaded polygon.

PREFERRED EMBODIMENT/DYNAMIC PARTITIONING

In the presently preferred embodiment, a single processor is used to implement each stage of the multiple stage pipeline arrangement. This preferred embodiment will now be described.

As illustrated in FIG. 4, lighting model processing system 60 consists of four separate, identical, floating point processors 62, 64, 66, and 68 arranged and operated in pipeline. The first and second processors 62 and 64 perform lighting model calculations; the third processor 66 performs a projection transformation and maps from viewing space to screen space; and the fourth processor 68 performs depth cueing, color mapping and color clipping.

To optimize performance, provision is made for dynamic partitioning, preferably via a distinct datastream command read by the microcode inside each of the relevant floating point processors, of the lighting model calculations among the first and second processors in order to maintain a computational workload balance between said two processors. The partitioning of the lighting model calculations between the first and second floating point processors varies depending on the number of light sources in the model. If there is a single light source as indicated, e.g. by a "Begin Shaded Polygon (Single Light Source)" datastream command, the first floating point processor 62 determines the light intensity due to the ambient and diffuse lighting effects, and the second floating point processor 64 determines the light intensity due to specular lighting effects. On the other hand, in the case of multiple light sources (see FIG. 6), as might for example be indicated by a "Begin Shaded Polygon (Multiple Light Sources)" datastream command, the first floating point processor 62' determines the light intensity (ambient, diffuse and specular) due to odd numbered light sources, while the second floating point processor 64' determines the light intensity (ambient, diffuse and specular) due to even numbered light sources. This is done to evenly divide the work to be performed between these two floating point processors and thereby avoid creating a bottleneck in the pipeline.

More particularly, when there is only one light source in the lighting model (see FIG. 4):

a. the first floating point processor 62 calculates for each vertex the intensity due to ambient light and diffuse reflection, and then passes this value to the second floating point processor;

b. the second floating point processor 64 calculates for each vertex the intensity due to specular reflection, and adds this result to the value passed to it by the first floating point processor; the second floating point processor then sends the data to the next floating point processor;

c. the third floating point processor 66 performs a projection transformation and maps the coordinate data from viewing space to the screen space of the display system, passing this data to the next floating point processor; and d. the fourth floating point processor 68 does the calculations for depth cueing, color mapping and color clipping.

Figure 6:
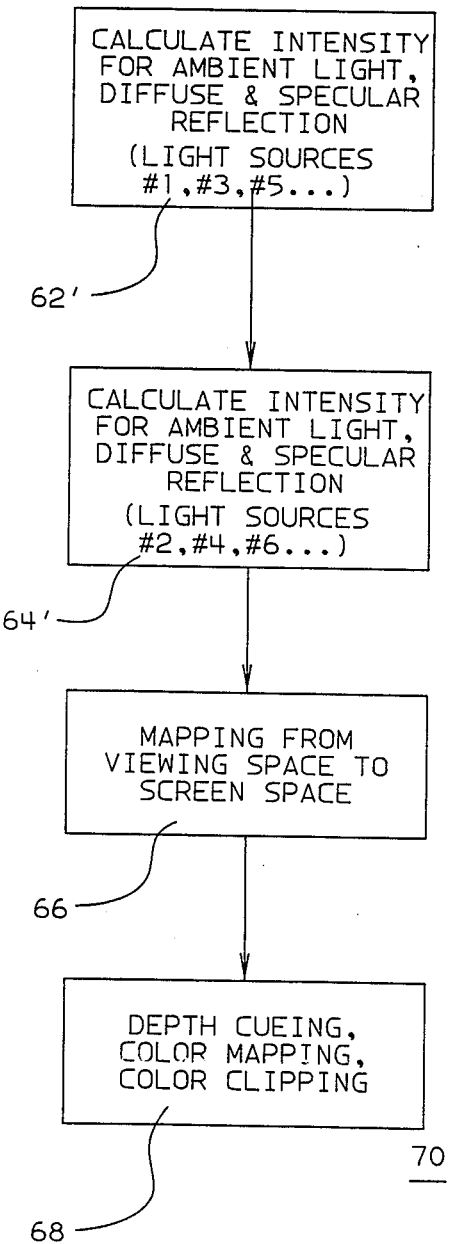
FIG. 6 depicts a multiple light source configuration of a lighting model processing system of the present invention.

When there are multiple light sources in the lighting model (see FIG. 6);

a. the first floating point processor 62' calculates for each vertex the intensity due to ambient light, and diffuse and specular reflection of the odd numbered (#1, #3, #5, #7, etc.) light sources and then passes this value to the second floating point processor;

b. the second floating point processor 64' calculates for each vertex the intensity due to ambient light, and diffuse and specular reflection of the even numbered (#2, #4, #6, #8, etc.) light sources and then adds this result to the one passed to it by the first floating point processor; it then passes this data to the third floating point processor;

c. the third floating point processor 66 performs a projection transformation and maps the coordinate data from viewing space to the screen space of the display system, passing this data to the next floating point processor; and d. the fourth floating point processor 68 does the calculations for depth cueing, color clipping and color mapping.

ALTERNATE EMBODIMENT

FIG. 5 depicts an alternate hardware embodiment 61 of the lighting model processing system of the present invention. In this alternate embodiment, the first and second stages of the system are each composed of three of the identical processors arranged in parallel. Each of these processors may be advantageously used to operate on a different color component. By way of example, a single light source modeling system is shown in FIG. 5 wherein first stage floating point processor 62R calculates ambient and diffuse lighting effects with regard to a red light component and passes the resulting red component intensity value to a second stage floating point processor 64R which calculates the specular reflection effect on the red component and adds that to the value received from floating point processor 62R. In a similar fashion, first stage floating point processor 62G and second stage floating point processor 64G perform lighting model calculations on a green component, while first stage floating point processor 62B and second stage floating point processor 64B perform the lighting model calculations on a blue component. The remainder of the system (i.e. the third and fourth stages) are unchanged.

GENERAL LIGHTING MODEL

For illustrative purposes, a RGB (red, green, blue) color model is used in this description. However, the principles of the invention are applicable to other color models as well, e.g. CMY (cyan, magenta, yellow), YIQ, HSV (hue, saturation, value), HLS (hue, lightness, saturation) etc. Similarly, the invention is applicable not only to light sources assumed to be at infinity but also to those at a finite distance, and to spot lighting and other lighting effects.

Various specific implementations of the lighting model processing system of the present invention will be described hereinafter by reference to pseudocode used to program the individual processors. The case of perspecitve projection (viewpoint at a finite distance) will be covered in detail. The simpler case of parallel projection (the viewpoint at infinity) will be covered briefly by mentioning the differences that occur when the viewpoint is at infinity. But first, a generalized lighting model taking into account the number of light sources, surface characteristics, and the positions and orientations of the surfaces and sources will be developed.

The Viewing Coordinate System adopted here is the right-hand system. If we considered looking at a display screen, then the x-axis points to the right, y-axis points upward, and the z-axis points toward us. Therefore, z-coordinate of the data is less than the z-coordinate of the viewpoint.

The following are the parameters of the lighting model with 1 light source:

Iar /* red intensity of the ambient light */
IaG /* green intensity of the ambient light */
IaB /* blue intensity of the ambient light */
IsoulR /* red intensity of the light source */
IsoulG /* green intensity of the light source */
IsoulB /* blue intensity of the light source */
kaR /* shading material red ambient constant */
kaG /* shading material green ambient constant */
kaB /* shading material blue ambient constant */
kdR /* shading material red diffuse constant */
kdG /* shading material green diffuse constant */
kdB /* shading material blue diffuse constant */
ks /* shading constant for specular reflection */
kn /* shading constant-exponent for cos */

For a given vertex x, y, z and normal N=(a, b, c) to the surface at that vertex, let:

L be the unit vector from the vertex to the light source, i.e. the direction to the point light source;
R be the direction of reflection; and
V be the direction to the viewpoint.

Then the shading color/intensity at the vertex is given by the sum of the following three terms: (we only inluce the R-component, the other two, G and B, can be expressed in a similar fashion)

1. ambient light
   IaR*kaR
2. diffuse reflection
   IsoulR*kdR*(L.N)
   /* L.N denote the inner product */
3. specular reflection
   IsoulR*ks*((R.V)**kn)

The light sources in the lighting model considered here are assumed at infinity. Their positions are specified by directional vectors of unit length; the viewpoint is at infinity.

For multiple light sources, we have multiple terms for the second and third items.

Assume there are j light sources ($1 < j <= M$) where M is the maximum number of light sources to be allowed in the particular implementation.

The shading color/intensity at the vertex is given by the sume of the following three terms: (we only inclue the R-component, the other two, G and B, can be expressed in similar fashion)

1. ambient light
   Iar*kaR
2. diffuse reflection
   IsoulR*kdR(L1.N9) +... + IsoujR*kdR(Lj.N)
   /* L.N denote the inner product */
3. specular reflection
   IsoulR*ks*((Rl.V)**kn)    +. . .    +
   IsoujR*ks*((Rj.V)**kn)

A more detailed description of the derivation of the general lighting model can be found, for example, in Foley & Van Dam "Fundamentals of Interactive Computer Graphics" Addison-Wesley 1984, pp 575-578.

Specific exemplary implementations of the lighting model processing system of the present invention will now be presented. First, the lighting model calculations performed by the first and second processors are described for the following cases: single light source—viewpoint at a finite distance; single light source—viewpoint at an infinite distance, multiple light sources—viewpoint at a finite distance, and multiple light sources—viewpoint at an infinite distance. Then the mapping function performed by the third processor, and the depth cueing, color mapping and color clipping functions performed by the fourth processor (which functions are common to all of the above listed cases) are presented.

In the following examples, software is presented in pseudocode, a commonly used notational scheme in which a single asterisk (*) indicates a multiplication operation, double asterisks (**) denotes a power term, the symbol (<) denotes "gets the value of", and in which a comment is bracketed between /* and */.

SINGLE LIGHT SOURCE—VIEWPOINT AT A FINITE DISTANCE

This is the case of a single light source at a finite distance from the object with perspective projection (i.e. the viewpoint is at a finite distance from the object). The function of calculating the intensity of the vertex is divided among two floating point processors. The first floating point processor calculates the intensity of the ambient light and the diffuse term; and the second floating point processor calculates the intensity of the specular term.

The input to the first floating point processor consists of six pieces of data:
  x, y, z coordinates of vertex; and
  the coordinates of the normal to the surface at the vertex, i.e. a, b, c.

The output of the first floating point processor to the second floating point processor for each vertex consists of nine words:
  x, y, z coordinates of the vertex;
  the components of the reflection direction rx, ry, rz; and
  the partial intensity values (ambient plus diffuse effects) for R, G, and B.

The pseudocode for the first and second floating point processors, for this case, follows:

Procedure Intensity__Single 12 (viewpoint at a finite distance)
/* first Floating Point Processor */
Input:
  x, y, z /* coordinates of the vertex */
  a, b, c /* components of the unit normal */
Output:
  x, y, z /* coordinates of the vertex */
  rx, ry, rz /* components of the reflection direction */
  IntensR /* r-component of intensity */
  IntensG /* g-component of intensity */
  IntensB /* b-component of intensity */
Constants:
  IaR /* red intensity of the Ambient Light */
  IaG /* green intensity of the Ambient Light */
  IaB /* blue intensity of the Ambient Light */
  IsoulR /* red intensity of the light source */
  IsoulG /* green intensity of the light source */
  IsoulB /* blue intensity of the light source */
  kdR /* shading material red diffuse constant */
  kdG /* shading material green diffuse constant */
  kdB /* shading material blue diffuse constant */
  kaR /* shading material red ambient constant */
  kaG /* shading material green ambient constant */
  kaB /* shading material blue ambient constant */
  ks /* shading constant for specular reflection */
  kn /* shading constant-exponent for cos */
  uxl, uyl, uzl /* light source 1 */
  vx, vy, vz /* viewpoint */
Variables:
  x, y, z /* coordinate of the vertex */
  a, b, c /* components of the unit normal */
  wx, wy, wz /* vector from vertex to light source */
  normw /* length of (wx, wy, wz) */
  rx, ry, rz /* reflection direction */
  normr /* length of (rx, ry, rz) */
  tx, ty, tz /* vector from vertex to viewpoint */
  IntensR /* R-component of intensity */
  IntensG /* G-component of intensity */
  IntensB /* B-component of intensity */
  normt /* length of (tx, ty, tz) */
  innproc /* inner product of the vector from light source to the vertex and unit normal */
  shadcos /* cos term for specular reflection */
  light /* temporary value */
  temp /* temporary value */
1 finitel: /* code entered when "Begin Shaded Polygon (single light source)" command is encountered */
  1. read in data
  2. if it is a GESP (end shaded polygon) command, output the command, and exit; /* read in x, y, z coordinates of the vertex, and calculate vector from the vertex to the light source */
  3. read in x; and
     wx<—uxl−x,
  4. output x to second Floating Point Processor
  5. read in y; and
     wy<—uyl−y,
  6. output y to second Floating Point Processor
  7. read in z; and
     wz<—uzl−z;
  8. output z to second Floating Point Processor
  9. read in a; /* normal at vertex */
  10. read in b;
  11. read in c;
  12. The inner product of the vector from vertex to the light source and the unit normal innproc ← —wx*a+wy*b+wz*c /* reflection direction for specular reflection */
13. temp ← —2*innproc
14. rx ← —temp*a—wx
15. output rx to second Floating Point Processor
16. ry ← —temp*b—wy
17. output ry to second Floating Point Processor
18. rz ← —temp*c—wz
19. output rz to second Floating Point Processor
20. distance between the light source and the vertex
   a. normw ← —wx*wx+wy*wy+wz*wz
   b. normw ← —sqrt (normw)
21. Ambient light R-G-B components
   a. IntensR ← —kaR*IaR
   b. IntensG ← —kaG*IaG
   c. IntensB ← —kaB*IaB
22. constant used in the calculation for intensity
   a. if innproc ← —0 then light ← —0;
   b. else light ← —innproc/normw
23. calculate Intensity (diffuse reflection)
   IntensR ← —IntensR+IsoulR*kdR*light
24. output IntensR to second Floating Point Processor
25. calculate Intensity (diffuse reflection)
   IntensG ← —IntensG+isoulG*kdG*light
26. output IntensG to second Floating Point Processor
27. calculate Intensity (diffuse reflection)
   intensB ← —IntensB+IsoulB*kdB*light
28. output IntensB to second Floating Point Processor
29. go to 1 finitel Procedure Intensity_Single 22 (viewpoint at a finite distance) /* second Floating Point Procesor */
Input:
   x, y, z /* coordinates of the vertex */
   IntensR /* r-component of intensity due to ambient, diffuse */
   IntensG /* g-component of intensity due to ambient, diffuse */
   IntensB /* b-component of intensity due to ambient, diffuse */
   rx, ry, rz /* reflection direction */
Output:
   x, y, z /* coordinates of the vertex */
   IntensR /* r-component of intensity due to ambient, diffuse and specular */
   IntensG /* g-component of intensity due to ambient, diffuse and specular */
   IntensG /* b-component of intensity due to ambient, diffuse and specular */
Constants:
   IsoulR /* red intensity of the light source */
   IsoulG /* green intensity of the light source */
   IsoulB /* blue intensity of the light source */
   kdR /* shading material red diffuse constant */
   kdG /* shading material green diffuse constant */
   kdB /* shading material blue diffuse constant */
   ks /* shading constant for specular reflection */
   kn /* shading constant-exponent for cos */
   uxl, uyl, uzl /* light source 1 */
   vx, vy, vz /* viewpoint */
Variables:
   x, y, z /* coordinates of the vertex */
   a, b, c /* components of the unit normal */
   wx, wy, wz /* vector from vertex to light source */
   normw /* length of (wx, wy, wz) */
   rx, ry, rz /* reflection direction */
   normr /* length of (rx, ry, rz) */
   tx, ty, tz /* vector from vertex to viewpoint */
   IntensR /* R-component of intensity */
   IntensG /* G-component of intensity */
   IntensB /* B-component of intensity */
   normt /* length of (tx, ty, tz) */
   innproc /* inner product of the vector from light source to the vertex and unit normal */
   shadcos /* cos term for specular reflection */
   light /* temporary value */
   temp /* temporary value */
1 finite 2: /* code entered when "Begin Shaded Polygon (Single Light Source)" commande is encountered */
1. read in data
2. if it is a GESP (end shaded polygon) command, output the command, and exit;
3. read in x; /* vertex coord */
4. output x;
5. read in y;
6. output y;
7. read in z;
8. output z;
/* The following two steps are used in specular reflection calculation for viewpoint at a finite distance */
9 vector from the vertex to the viewpoint
   a. tx ← —vx—x,
   b. ty ← —vy—y,
   c. tz ← —vz—z;
10. distance between viewpoint and the vertex
   a. normt ← —tx*tx+ty*ty+tz*tz
   b. normt ← —sqrt (normt) /* read in the component of reflection direction */
11. read in rx
12. read in ry
13. read in rz
14. norm of reflection direction
   normr ← —rx*rx+ry*ry+rz*rz
   normr ← —sqrt (normr)
15. calculate the cos of the reflection angle
   temp ← —tx*rx+ty*ry+tz*rz
   a. if temp<0, then shadcos ← —0
   b. else
   (1) temp ← —temp/(normr*normt)
   (2) shadcos ← —temp**kn
   (3) shadcos ← —ks*shadcos
16. read in Intensr
17. calculate the specular reflection
   IntensR ← —IntensR+IsoulR*shadcos
18. output IntensR
19. read in IntensG
20. calculate the specular reflection
   IntensG ← —IntensG+isoulG*shadcos
21. output IntensG
22. read in IntensB
23. calculate the specular reflection
   IntensB ← —IntensB+IsoulB*shadcos
24. output IntensB
25. goto 1 finite 2

SINGLE LIGHT SOURCE—VIEWPOINT AT INFINITY

The simpler case where the viewpoint is at infinity (parallel projection) differs from the above described case where the viewpoint is at a finite distance, only in the treatment of the reflection vector during the calculation of the light due to specular reflection. In the case where the viewpoint is at infinity, only the z-component is used since the viewpoint direction is given by (0, 0, 1) in a parallel projection case.

MULTIPLE LIGHT SOURCES—VIEWPOINT AT A FINITE DISTANCE

In this example, the maximum number of light sources is assumed to be 10. The function of calculating the intensity for each vertex is divided among two floating point processors. The first floating point processor processes the color intensity due to light source #1, #3, #5, etc., and the second floating point processor processes the color intensity due to light source #2, #4, #6, etc.

The pseudocode for the first floating point processor, for this case, follows:

Procedure Intensity_Multiple 12 (viewpoint at a finite distance)
/* first Floating Point Processor */
Inputs:
  x, y, z /* coordinates of the vertex */
  a, b, c /* components of the unit normal */
Outputs:
  x, y, z /* coordinates of the vertex */
  a, b, c /* component of the unit normal */
  IntensR /* r-component of intensity */
  IntensG /* g-component of intensity */
  IntensB /* b-component of intensity */
Constants:
  IaR /* red intensity of the Ambient Light */
  IaG /* green intensity of the Ambient Light */
  IaB /* blue intensity of the Ambient Light */
  Isou1R /* red intensity of light source #1 */
  Isou3R /* red intensity of light source #3 */
  Isou5R /* red intensity of light source #5 */
  Isou7R /* red intensity of light source #7 */
  Isou9R /* red intensity of light source #9 */
  Isou1G /* green intensity of light source #1 */
  Isou3G /* green intensity of light source #3 */
  Isou5G /* green intensity of light source #5 */
  Isou7G /* green intensity of light source #7 */
  Isou9G /* green intensity of light source #9 */
  Isou1B /* blue intensity of light source #1 */
  Isou3B /* blue intensity of light source #3 */
  Isou5B /* blue intensity of light source #5 */
  Isou7B /* blue intensity of light source #7 */
  Isou9B /* blue intensity of light source #9 */
  kdR /* shading material red diffuse constant */ kdG
    /* shading material green diffuse constant */
  kdB /* shading material blue diffuse constant */
  kar /* shading material red ambient constant */
  kaG /* shading material green ambient constant */
  kaB /* shading material blue ambient constant */
  ks /* shading constant for specular reflection */
  kn /* shading constant-exponent for cos */
  ux1,uy1,uz1 /* light source 1 */
  ux3,uy3,uz3 /* light source 3 */
  ux5,uy5,uz5 /* light source 5 */
  ux7,uy7,uz7 /* light source 7 */
  ux9,uy9,uz9 /* light source 9 */
  vx,vy,vz /* viewpoint */
Variables:
  wx,wy,wz /* vector from vertex to light source */
  normw /* length of (wx,wy,wz) */
  rx,ry,rz /* reflection direction */
  normr /* length of (rx,ry,rz) */
  tx,ty,tz /* vector from vertex to viewpoint */
  IntensR /* R-component of intensity */
  IntensG /* G-component of intensity */
  IntensB /* B-component of intensity */
  normt /* length of (tx,ty,tz) */
  innproc /* inner product of the vector from light source to the vertex and unit normal */
  shadcos /* cos term for specular reflection */
  Lnum /* number of light sources */
  light /* temporary value */
  temp /* temporary value */
mfinite1:
  /* code entered when "Begin Shaded Polygon (Multiple Light Sources) command is encountered */
a. read in data
b. if it is a GESP (end shaded polygon) command, output the command, and exit;
/* read in x,y,z coor of the vertex, and calculate vector from the vertex to viewpoint which is used in specular reflection calculation for viewpoint at a finite distance */
c. read in x; and
  tx $\leftarrow$ vx−x,
d. output x to second Floating Point Processor
e. read in y; and
  ty $\leftarrow$ vy−y,
f. output y to second Floating Point Processor
g. read in z; and
  tz $\leftarrow$ vz−z,
h. output z to second Floating Point Processor
i. read in a; /* normal at vertex */
j. output a to second Floating Point Processor
k. read in b;
l. output b to second Floating Point Processor
m. read in c;
n. output c to second Floating Point Processor
/* The following steps are used in specular reflection calculation for viewpoint at a finite distance
1. distance between viewpoint and the vertex
  a. normt $\leftarrow$ tx*tx+ty*ty+tz*tz
  b. normt $\leftarrow$ sqrt(normt)
2. Ambient light R-G-B components
  a. IntensR $\leftarrow$ kaR*IaR
  b. IntensG $\leftarrow$ kaG*IaG
  c. IntensB $\leftarrow$ kaB*IaB
3. For j=1 to Lnum
  a. diffuse term
    (1) vector from the vertex to the light source:
      wx $\leftarrow$ uxj−x,
      wy $\leftarrow$ uyj−y,
      wz $\leftarrow$ uzj−z;
    (2) The inner product of the vector from vertex to light source and the unit normal
      innproc $\leftarrow$ wx*a+wy*b+wz*c
    (3) distance betwee the light source and the vertex
      (a) normw $\leftarrow$ wx*wx+wy*wy+wz*wz
      (b) normw $\leftarrow$ sqrt(normw)
    (4) constant used in the calculation for intensity
      (a) if innproc $\leftarrow$ 0 then light $\leftarrow$ 0;
      (b) else light $\leftarrow$ innproc/normw
    (5) calculate Intensity (diffuse reflection)
      IntensR $\leftarrow$ IntensR+IsoujR*kdR*light
    (6) calculate Intensity (diffuse reflection)
      IntensG $\leftarrow$ IntensG+IsoujG*kdG*light
    (7) calculate Intensity (diffuse reflection)
      IntensB $\leftarrow$ IntensB+IsoujB*light
  b. calculate Intensity (specular reflection)
    (1) reflection direction
      temp $\leftarrow$ 2*innproc

```
rx < —temp*a—wx
ry < —temp*b—wy
rz < —temp*c—wz
```
(2) norm of reflection direction
```
normr < —rx*rx+ry*ry+rz+rz
normr < —sqrt(normr)
```
(3) calculate the cos of the reflection angle
```
temp < —tx*rx+ty*ry+tz*rz
```
(a) if temp < B 0, then shadcos < —0
(b) else
  i. temp < —temp/(normr*normt)
  ii. shadcos < —temp**kn
  iii. shadcos < —ks*shadcos
(4) calculate the specular reflection
  IntensR < —IntensR+IsoujR*shadcos
(5) calculate the specular reflection
  IntensG < —IntensG+IsoujG*shadcos
(6) calculate the specular reflection
  IntensB < —IntensB+IsoujB*shadcos
4. output IntensR to second Floating Point Processor
5. output IntensG to second Floating Point Processor
6. output IntensB to second Floating Point Processor
7. goto mfinitel The Pseudocode for the second floating point processor in this case (multiple light sources—viewpoint at a finite distance) is identical to that listed above for the first floating point processor, with the following differences:

1. The reflection direction (direction to the viewpoint) calculated by the first floating point processor is passed as an input to the second floating point processor so that the second floating point processor does not need to calculate it.

2. The light contributions due to the even-numbered light sources (#2,#4,#6, etc.) are computed rather than those due to the odd-numbered light sources; and 3. The contributions due to the even-numbered light sources are added to the contributions of the odd-numbered light sources (which were passed from the first floating point processor to the second as inputs) to obtain the total light intensity at each vertex.

MULTIPLE LIGHT SOURCES—VIEWPOINT AT INFINITY

Once again, the case where the viewpoint is at infinity (parallel projection) differs from the case where the viewpoint is at a finite distance, only in the treatment of the reflection vector during the calculation of the light due to specular reflection. In the case where the viewpoint is at infinity, only the z-component is used since the viewpoint direction is given by (0, 0, 1) in the parallel projection case.

PROCEDURE TO PERFORM PROJECTION AND MAPPING TRANSFORMATIONS—THE THIRD PROCESSOR

This stage of the pipeline performs the following two steps on each polygon vertex in the order listed:

1. An input vertex is transformed from the 3D viewing space to another 3D space according to a "projection" transformation that has the following characteristics:
   a. The x and y coordinates produced by the transformation are the projection of the vertex onto the viewing plane;
   b. The transformation preserves planarity (i.e., applying the transformation to vertices that are coplanar in the 3D viewing space yields vertices that are coplanar in the output 3D space.

2. The transformed vertex is then mapped to the viewpoint by means of a "mapping" transformation.

In the case of perspective projection (viewpoint at a finite distance from the object), the projection transformation is accomplished by means of the following formulae:

$$X\text{proj} = \frac{x}{1+\frac{z}{d}}$$

$$Y\text{proj} = \frac{y}{1+\frac{z}{d}}$$

$$Z\text{proj} = \frac{-1}{1+\frac{z}{d}}$$

where (Xproj, Yproj) is the projection of (x,y,z) from the 3D viewing space onto the viewing plane, and d is the distance from the viewpoint to the viewing plane. The projection function for z is chosen to ensure that the projection of a plane in the 3D viewing space is still a plane, and that Zproj increases as z increases. The depth cueing reference planes z=Pf and z=Pb described in the next section are defined in the output space of the projection transformation.

In the case of parallel projection (viewpoint at infinity), the viewing space coordinate values themselves are used as the projection values:
Xproj=x
Yproj=y
Zproj=z.

Whether parallel or perspective, the projection transformation is followed by the mapping transformation, which is accomplished by means of the following formulae:
- Xscreen < —XVmin+Rx*(X—XCmin)
  Yscreen < —YVmin+Ry*(Y—YCmin)
where XVmin is the left boundary of the viewport (the area of the screen which will be used to display the image), XCmin is the left boundary of the clipping volume (the region of viewing space which will be mapped to the viewport), YVmin is the lower boundary of the viewport, YCmin is the lower boundary of the clipping volume, and Rx and Ry are the X and Y ratios of the size of the viewport to the size of the clipping volume.

Pseudocode for the projection and mapping procedure follows:

Procedure Projection and Mapping

Input:
  x /* Vertex viewing x coordinate */
  y /* Vertex viewing y coordinate */
  z /* Vertex viewing z coordinate */
  IntensR /* Vertex color (red) */
  IntensG /* color (green) */
  IntensB /* Vertex color (blue) */
Output:
  Xs /* Vertex screen x coordinate */
  Ys /* Vertex screen y coordinate */
  Zproj /* Vertex projected z coordinate */
  IntensR /* Vertex color (red); unchaged */
  IntensG /* Vertex color (green); unchanged */
  IntensB /* Vertex color (blue); unchanged */
constants:

Rx /* Ratio of x size of viewport to clipping window */
Ry /* Ratio of ysize of viewport to clipping window */
XVmin /* left edge of viewport */
XCmin /* left edge of clipping window */
YVmin /* lower edge of viewport */
YCmin /* lower edge of clipping window */
Variables:
Aux /* temporary value */ proj_and_map:

1. read in next piece of data
2. if it is a GESP (end shaded polygon) command, output the command, and exit;
3. Read in x and store in Xproj;
   /* compute Xproj for parallel case */
4. Read in y and stored in Yproj;
   /* compute Yproj for parallel case */
5. Read in z and store in Zproj;
   /* compute Zproj for parallel case */
6. if viewpoint is at infinity (parallel projection mode), goto mapping;
7. Aux<—Zproj/d
   /* compute Zproj for perspect. case */
8. Aux<—Aux+1
9. Zproj<—(−1)/Aux
10. Xproj<—x*Zproj
    /* compute Xproj for perspect. case */
11. Yproj<—y*Zproj
    /* compute Yproj for perspect. case */ mapping:

12. Aux<—Xproj−XCmin
    /* Computation of Xs, the screen X value */
13. Aux<—Aux*Rx
14. Xs<—Aux+XVmin
15. Output Xs.
16. Aux<—Yproj−YCmin
    /* Computation of Ys, the screen Y value */
17. Aux<—Aux*Ry
18. Yx<—Aux+YVmin
19. Output Ys.
20. Output Zproj.
21. Read in IntensR.
22. Output IntensR.
23. Read in IntensG.
24. Output IntensG.
25. Read in IntensB.
26. Output IntensB.
27. goto proj_and_map.

PROCEDURE TO PERFORM DEPTH CUEING, COLOR MAPPING AND COLOR CLIPPING—THE FOURTH PROCESSOR

The following conceptual steps are implemented in this processor:
Depth cueing (the changing of the light intensity at a point as a function of the point's distance from the viewer);
Color mapping (the process by which the light intensities calculated as a result of the lighting and depth cueing processes are mapped to the dynamic color capabilities of the subsequent display system); and
Color clipping (the process by which intensities that exceed the maximum intensity supported by the dynamic color capabilities of the display system are replaced with the maximum intensity value).

DEPTH CUEING

In this process, the RGB intensities calculated by the lighting model at a vertex are blended with a specified color value as a visual cue indicating to the workstation user which portions of the image on the screen are furthest from the viewpoint. This is done by means of a mixing function which varies the output color intensity as a function of the z coordinate of the vertex:

$Ci = w*Intensi + (1-w)*Cdi$

Where:
Intensi is the component of the input color at the vertex;
Cdi is the component of the color intensit with which blending is done; and
Ci is the component of the output color intensity at the vertex;
for i=R, G, and B, and
Pf is the z value of the front reference plane;
Pb is the z value of the back reference plane;
Sf is the front scale factor;
Sb is the back scale factor; and
w, the mixing function variable, is defined as a function of Zproj, the z value created by the projection and mapping stage, according to the following formulae:

$$w = Sb + \frac{Sf - Sb}{Pf - Pb}(Zproj - Pb); Pf> = Zproj> = Pb$$

$w = Sf; Zproj > Pf$
$w = Sb; Zproj < Pb$

COLOR MAPPING

The color intensities calculated by the lighting and depth cueing processes are independent of the dynamic range of color intensities that can be displayed by the display hardware subsequent in the system. In order to couple the lighting model calculation stages to the display hardware following it in the graphics workstation, this step applies a linear transformation to each individual color component to match the dynamic color range available in the display hardware. The new color values, C'i (i=R, G, and B) are obtained by means of the formulae:

C'i = ai Ci + bi (i=R, G, B)

where the ai's and bi's are the color mapping parameters appropriate for the display hardware.

COLOR CLIPPING

Even after the mapping step, the intensities calculated by the lighting stage may range higher than the maximum intensity supported by the display hardware. The purpose of the color clipping step is to make sure the color intensities passed to the display hardware do not exceed the maximum allowed value. This removes saturation problems caused by large color values created during the lighting calculation stages. The new color values, C"i (i=R, G, and B), are given by the formulae:

C"i = MIN(Bhi, C'i) (i=R, G, B)

where Bhi is the maximum allowable value for color component i, and C'i is the output color component from the color mapping step. In addition, this step converts the floating point representation of the output color intensity to the integer representation needed by the display hardware.

IMPLEMENTATION

Since the formulae used in the depth cueing and color mapping steps are linear equations, they can be combined into one equation to reduce the number of calculations that must be performed in this stage of the pipeline. To this end, the following parameters of the combined equation are calculated in advance, that is, at the time that the control parameters for these steps are specified:

$Qfi = ai*Sf$
$Qbi = ai*Sb$
$Ai = ai*F$
$Bi = ai*(Sb - F*Pb)$
$hi = ai*Cdi + bi$
for $i = R, G,$ and $B$, where $$F = \frac{Sf - Sb}{Pf - Pb}$$

Having calculated the preceding parameters in advance, the following sequence of operations is performed:

1. Compute gi as a linear function of z, the depth cueing parameters, and the display hardware parameters:

$qi = Ai*Zproj + Bi; Pf> = Zproj> = Pb \ (i = R, G, B)$
$qi = Qfi; Zproj > Pf$
$qi = Qbi; Zproj < Pb$ Ai, Bi, Qfi, and Qbi being constants computed as mentioned above.

2. Compute the mapped depth-cued color intensity C'i as a function of the input color Ci and previously computed parameters qi and hi:

$C'i = qi \ (Ci - Cdi) + hi \ (i = R, G, B)$

3. Clip the mapped depth-cured color intensity C'i and convert it to integer representation for the subsequent display hardware's use:

$C''i = TRUNC(MIN(Bhi, C'i)) \ (i = R, G, B)$ where the function TRUNC(for TRUNCation) converts the floating point value to integer representation.

Pseudocode suitable for implementing the depth cueing, color mapping and color clipping procedures follows:

Procedure Depth_Color

Input:
Xs /* Vertex screen coordinate */
Ys /* Vertex screen coordinate */
Zproj /* Vertex projected z coordinate */
IntensR /* Vertex color (red) */
IntensG /* Vertex color (green) */
IntensB /* Vertex color (blue) */

Output:
Xs /* Vertex screen coordinate */
Ys /* Vertex screen coordinate */
Zproj /* Vertex projected z coordinate */
C"R /* Vertex color (red) */
C"G /* Vertex color (green) */
C"B /* Vertex color (blue) */

Constants:
QfR /* constant computed when control parameters loaded */
QfG /* constant computed when control parameters loaded */
QfB /* constant computed when control parameters loaded */
QbR /* constant computed when control parameters loaded */
QbG /* constant computed when control parameters loaded */
QbB /* constant computed when control parameters loaded */
AR /* constant computed when control parameters loaded */
AG /* constant computed when control parameters loaded */
AB /* constant computed when control parameters loaded */
BR /* constant computed when control parameters loaded */
BG /* constant computed when control parameters loaded */
BB /* constant computed when control parameters loaded */
hR /* constant computed when control parameters loaded */
hG /* constant computed when control parameters loaded */
hB /* constant computed when control parameters loaded */
BhR /* maximum allowable red intensity */
BhG /* maximum allowable green intensity */
BhB /* maximum allowable blue intensity */
Pf /* Z-value of front reference plane */
Pb /* Z-value of back reference plane */

Variables:
Aux /* temporary value */

Program flow:
1. For each vertex DO
2. Read in Xs.
3. Output Xs.
4. Read in Ys.
5. Output Ys.
6. Read in Zproj.
7. Output Zproj. For i=R, G, B DO
8. Read in Ci
9. Aux=qi /* Computation of qi as a function of Zproj */
10. Aux=Aux (Ci-Cdi)+hi /* Computation of C'i */
11. Aux=MIN (Bhi,Aux)
12. Aux=Truncate Aux
13. Output Aux
14. Enddo
15. Enddo From the preceding detailed description it will be apparent that a new lighting model processing system has been developed which exhibits high throughput, affords improved interactivity and higher image quality, and fulfills all of the other objects set forth hereinabove. Although various specific embodiments have been depicted and described, it will be evident to those skilled in this art that numerous modifications, substitutions, additions and other changes may be made without departing from the principles of the invention, the scope of which is defined by the claims appended hereto.

What is claimed is:

1. Apparatus for processing lighting model information in order to display a shaded image of an object upon a viewing screen of a computer graphics display system, wherein an object is represented in viewing space by a mesh polygons, each polygon being defined by a set of vertices with the location of each of said vertices in viewing space being known, the apparatus comprising:
  a pipeline arrangement of multiple, identical floating point processors, which arrangement receives data representing coordinates in viewing space of vertices of a polygon and a normal at each of the vertices of the polygon, and calculates therefrom coordinates on the viewing screen of the vertices, and screen color intensity values associated with each of said vertices based upon a specified model;
  wherein said pipeline arrangement comprises;
  at least one processor for calculating for each of said vertices a first set of color intensity values due to ambient lighting and diffuse and specular reflection effects;
  a second processor for receiving and processing said first set of color intensity values to provide for depth cueing, color mapping and color clipping; and
  a third processor for performing a projection transformation and for mapping the coordinates of each of the vertices from viewing space to screen space.

2. The apparatus of claim 1 further comprising partitioning means for dynamically allocating computational tasks among various of the processors in accordance with different lighting models, in a fashion designed to maintain computational workload balance between said various processors.

3. Apparatus for processing lighting model information representing a plurality of light sources in order to display a shaded image of an object on a viewing screen of a computer graphics display system, comprising:
  multiple floating point processing stages for calculating screen vertex light intensity values due to ambient lighting of an object and surface reflection from said object, said stages being connected and operated in a pipeline arrangement.

4. The apparatus of claim 3 wherein each of said processing elements comprises a single identical VLSI chip.

5. The apparatus of claim 3 wherein each processing element comprises:
  an input FIFO, an output FIFO, floating point arithmetic processing means connected between said input FIFO and output FIFO, data storage means for interfacing with said arithmetic processing means, control logic and control program storage means, and sequencer means for controlling the operation of said arithmetic processing means and data storage means in accordance with said control logic and control program;
  and wherein:
  said data storage means comprises a bank of registers for storing data; and
  said arithmetic processing means comprises a floating point multiplier, means for calculating inverses and square roots, and a floating point adder, the adder being connected to said multiplier in such a way as to serve as an accumulator for the multiplier.

6. The apparatus of claim 3 wherein at least one of said processing stages comprises a plurality of said processing elements connected in parallel.

7. The apparatus of claim 3 wherein said pipeline arrangement of multiple processing stages comprises:
  first and second processing stages for jointly calculating vertex intensity values due to ambient light and diffuse and specular reflection; and
  a third processing stage for receiving the intensity values jointly calculated by said first and second processing stages and for further processing said intensity values to provide for depth cueing.

8. The apparatus of claim 7 further comprising a fourth processing stage for mapping vertices onto a viewing screen.

9. The apparatus of claim 8 wherein said third processing stage further comprises means for performing color mapping and color clipping.

10. The apparatus of claim 8 wherein said first and second processing stages are selectively programmable to accommodate a single light source model and a multiple light source model, with the intensity value calculations being partitioned so as to maintain a computational work load balance between said first and second processing stages.

11. The apparatus of claim 10 wherein the first processing stage calculates ambient lighting and diffuse reflection effects, and the second processing stage calculates specular reflection effects when said first and second processing stages are programmed to accommodate a single light source model.

12. The apparatus of claim 11 wherein said first processing stage calculates ambient lighting and diffuse and specular reflection effects for odd light sources, and the second processing stage calculates ambient lighting, and diffuse and specular reflection effects for even light sources when said first and second processing stages are programmed to accommodate a multiple light source model.

13. The apparatus of claim 4 in combination with:
  shading processing means for receiving and processing said screen vertex light intensity values to calculate light intensities of pixels interior to a visible objects;
  video pixel memory means connected to said shading processing means for storing light intensity information; and
  display monitor means connected to said video pixel memory means for displaying a shaded image of said object.

14. A method of performing lighting model calculations in a computer graphics display system to derive screen vertex light intensity values, the method comprising the steps of:
  providing multiple identical floating point processors capable of performing such lighting model calculations;
  connecting and operating said multiple processors in a pipeline arrangement; and
  partitioning the lighting model calculations among said multiple processors so as to substantially balance computational workload between said processors.

15. The method of claim 14 wherein said partitioning step comprises dynamically partitioning the lighting model calculations in a fashion designed to maintain substantial computational workload balance between said processors irrespective of the number of light sources being modeled.

16. A method for processing a graphics object for display in a viewport on a graphics display monitor according to a lighting model considering light from one or more light sources, said processing serving to transform an object represented by a plurality of vertex coordinates and vectors normal to each of said vertices into an object represented by a plurality of vertex coordinates transformed to monitor screen coordinates and a light intensity value for each vertex in response to a graphics command, said method comprising the steps of:

performing for each vertex of said objects:

calculating a first light intensity at a vertex from ambient light and diffuse reflection;

calculating a second light intensity at a vertex from specular reflection;

summing said first and second light intensities to give a vertex light intensity;

transforming said vertex and vertex light intensity into viewport coordinates for display on said display monitor.

17. The method according to claim 16 further comprising the steps of:

determining a viewpoint coordinate;

modifying said vertex light intensity as a function of the distance between said viewpoint and said vertex;

transforming said vertex light intensity to a representation capable of display on said display monitor;

transforming said vertex light intensity representation so it will not exceed the maximum intensity displayable on said display monitor.

18. The method according to claim 16, wherein said processing is accomplished by a plurality of processors and wherein said method includes an initial step of:

allocating processor resources for light intensity calculation depending upon the number of light sources.

19. The method of claim 18, wherein said allocating step comprises:

allocating a first processor to calculate said first light intensity and a second processor to calculate said second light intensity and to sum said first and second light intensities where only the light source is present; and allocating a first processor to calculate said first and second light intensities and to sum said light intensities for a first set of light sources and allocating a second processor to perform the calculating and summing for a second set of light sources where more than one light source is present.

20. The method of claim 19 wherein said first set of light sources includes all odd numbered light sources and said second set of light sources includes all even numbered sources.

21. The method of claim 18 wherein said calculating steps of said first processor occur concurrently with the calculating steps of said second processor.

22. The method of claim 21 further comprising the steps of:

allocating processor resources for mapping said vertex and vertex light intensity to said viewpoint on said display monitor;

allocating processor resources for modifying said vertex color intensity to provide depth cueing and to map and clip the color intensity.

23. The method of claim 18, wherein said calculating and summing steps are performed for each color component.

24. The method of claim 23, wherein said calculating and summing steps are performed in parallel for each color component.

25. A method for transforming a graphics object represented by a plurality of vertex coordinates and vertex normals for display on a display monitor, wherein a viewer viewpoint and lighting conditions including one or more light sources with position and intensity are defined and wherein said transformation results in the display of said graphics object as it would appear from the viewpoint under the specified lighting conditions, said method comprising the steps of:

selecting a lighting model based on the number of light sources and the position of each light source;

determining a first light intensity at a vertex due to ambient light and diffuse reflection, if only one light source exists;

determining a second light intensity at a vertex due to specular reflection added to said first light intensity, if only one light source exists, said second determining step operation concurrently with said first determining step for a subsequent vertex;

determining a first light intensity at a vertex due to ambient light, diffuse and specular reflection due to a first set of light sources, if more than one light source exists;

determining a second light intensity at a vertex due to ambient light, diffuse and specular reflection due to a second set of light sources and added to said first light intensity if more than one light source exists, said second determining step operating concurrently with said first determining step for a subsequent vertex;

transforming said vertex coordinates and light intensities to viewport coordinates for display on a display monitor;

transforming said light intensities based upon a color map available for said display monitor;

clipping said color intensity to a maximum allowed intensity value; and repeating said determining, transforming and clipping steps for all vertices in said graphics object.

26. The method of claim 25 wherein said determining steps are performed concurrently for each of a plurality of light components.

27. The method of claim 26 wherein said color components comprise red, green and blue.

* * * * *